(12) United States Patent
Sato et al.

(10) Patent No.: US 8,400,557 B2
(45) Date of Patent: Mar. 19, 2013

(54) APPARATUS FOR DETECTING FOCUS (75) Inventors: Koichi Sato, Saitama (JP); Kazuo Sugitani, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 132 days.

(21) Appl. No.: 12/836,847

(22) Filed: Jul. 15, 2010

(65) Prior Publication Data

US 2011/0013060 A1 Jan. 20, 2011

(30) Foreign Application Priority Data

Jul. 17, 2009 (JP) ................................. 2009-168798

(51) Int. Cl.
G03B 13/00 (2006.01)
G03B 17/00 (2006.01)

(52) U.S. Cl. .......... 348/345; 348/349; 348/350; 396/79; 396/80

(58) Field of Classification Search .................. None
See application file for complete search history.

(56) References Cited

U.S. PATENT DOCUMENTS

| 5,955,753 | A | 9/1999 | Takahashi | |
|---|---|---|---|---|
| 6,549,730 | B1 * | 4/2003 | Hamada | 396/111 |
| 7,102,675 | B1 | 9/2006 | Tokunaga | |
| 7,454,133 | B2 * | 11/2008 | Takahashi | 396/96 |
| 7,493,034 | B2 | 2/2009 | Nakata | |
| 7,515,819 | B2 * | 4/2009 | Takahashi | 396/121 |
| 7,616,251 | B2 * | 11/2009 | Kikuchi | 348/345 |
| 2002/0146247 | A1 * | 10/2002 | Nonaka | 396/96 |
| 2003/0138246 | A1 * | 7/2003 | Nakamura | 396/96 |
| 2004/0071457 | A1 * | 4/2004 | Nonaka et al. | 396/89 |
| 2004/0169765 | A1 * | 9/2004 | Nakata et al. | 348/345 |
| 2006/0120711 | A1 * | 6/2006 | Nakata | 396/123 |
| 2008/0079840 | A1 * | 4/2008 | Kariya et al. | 348/345 |
| 2009/0040354 | A1 * | 2/2009 | Takanashi | 348/308 |
| 2011/0008031 | A1 * | 1/2011 | Kusaka | 396/100 |

FOREIGN PATENT DOCUMENTS

JP 60-021015 2/1985

(Continued)

OTHER PUBLICATIONS

U.S. Appl. No. 12/822,383 to Sato et al., filed Jun. 24, 2010.

(Continued)

*Primary Examiner* — Lin Ye
*Assistant Examiner* — John H Morehead, III
(74) *Attorney, Agent, or Firm* — Greenblum & Bernstein, P.L.C.

(57) ABSTRACT

An apparatus that detects an in-focus state has a plurality of line sensors and an image signal output processor. The plurality of line sensors is arranged on a projection area. The image signal output processor outputs image signals of an object on the basis of electric charges accumulated in the plurality of line sensors. Each line sensor is equipped with a plurality of pairs of photoelectric converters, which are arrayed along the longitudinal direction of the line sensor, and a plurality of image-pixel signal-reading circuits. Each image-pixel signal-reading circuit reads electric charges from a corresponding pair of photoelectric converters. Also, each image-pixel signal-reading circuit has a first circuit that reads electric charges accumulated in one photoelectric converter and a second circuit that reads electric charges accumulated in the other photoelectric converter. Each image-pixel signal-reading circuit is positioned between the corresponding pair of photoelectric converters and segments of the first and second circuits being shared.

20 Claims, 6 Drawing Sheets

FOREIGN PATENT DOCUMENTS

| | | |
|---|---|---|
| JP | 9-46596 | 2/1997 |
| JP | 11-205694 | 7/1999 |
| JP | 2005-300844 | 10/2005 |
| JP | 2006-145792 | 6/2006 |
| JP | 2009-053540 | 3/2009 |
| JP | 2010-072193 | 4/2010 |

OTHER PUBLICATIONS

Japanese Office action dated Nov. 20, 2012, and an English language translation thereof.

* cited by examiner

APPARATUS FOR DETECTING FOCUS

BACKGROUND OF THE INVENTION

1. Field of the Invention

The present invention relates to a camera with an AF (Auto Focus) mechanism using a phase-difference method, such as an SRL (Single Reflex Lens) camera. In particular, it relates to an arrangement of circuits incorporated in an AF module.

2. Description of the Related Art

An SRL-type camera is equipped with an AF mechanism based on a phase-difference method, which has an optical image-forming system and a sensor module that is constructed from a focus-detection device, such as an IC chip. The optical image-forming system has a separator lens and a condenser lens, whereas the focus-detection device is equipped with a series of line sensors that are arrayed within a projection area of the optical system. Each line sensor is constructed of a plurality of pairs of photodiodes arrayed along the same direction.

In U.S. Pat. No. 7,493,034, an AF sensor in which a plurality of pairs of line-sensors is arrayed in a projection area is disclosed. An optical system divides a ray bundle from an object into two ray bundles to project a pair of images onto the pairs of line-sensors. Each line-sensor outputs image-pixel signals by photoelectric conversion, and a difference between the positions of the two images, namely a phase difference, is detected. The difference represents an out-of-focus magnitude. Whether or not an object is in focus can be determined by the detected out-of-focus magnitude. When the object is out of focus, an amount of movement by the focusing lens and a shift in its direction are determined. Then, the focusing lens is driven.

Generally, a line sensor is an electric charge storage or accumulation-type sensor, and an accumulation period is adjusted by a monitor sensor that is arrayed alongside the line sensor. For example, as disclosed in U.S. Pat. No. 7,102,675, a monitor sensor consistently detects the intensity of light and outputs monitor signals in order to prevent the target line sensor from receiving a quantity of light exceeding a dynamic range, which would cause electric charges to overflow from the line sensor. The amount of light that each line sensor receives varies according to the brightness distribution of an object. Therefore, a charge-accumulation period is controlled independently for each line sensor. When a monitor signal exceeds a predetermined threshold value, a corresponding line sensor stops the accumulation of electric charges, and accumulated electric charges are temporarily stored in a memory of the line sensor. After the accumulation of electric charges is completed by all of the line sensors, a series of image-pixel signals that corresponds to image signals of an object are output from the line sensors to an AF controller.

SUMMARY OF THE INVENTION

An object of the present invention is to provide a focus detection apparatus capable of precisely detecting an in-focus state while maximizing the effective utilization of a projection area.

An apparatus that detects an in-focus state, according to the present invention, has a plurality of line sensors and an image signal output processor. The plurality of line sensors is arranged on a projection area of an optical image-forming system. The image signal output processor outputs image signals of an object on the basis of electric charges accumulated in the plurality of line sensors.

Each line sensor is equipped with a plurality of pairs of photoelectric converters, which are arranged along the longitudinal direction of the line sensor, and a plurality of image-pixel signal-reading circuits. Each image-pixel signal-reading circuit reads electric charges from a corresponding pair of photoelectric converters. Also, each image-pixel signal-reading circuit has a first circuit that reads electric charges accumulated in one photoelectric converter and a second circuit that reads electric charges accumulated in the other photoelectric converter.

In the present invention, each image-pixel signal-reading circuit is placed between the corresponding pair of photoelectric converters, and a segment of the first circuit and a segment of the second circuit are shared.

A focus detection sensor according to another aspect of the present invention has a plurality of pairs of photoelectric converters, which are arranged in a line, and a plurality of image-pixel signal-reading circuits. Each image-pixel signal-reading circuit reads electric charges from a corresponding pair of photoelectric converters. Also, each image-pixel signal-reading circuit has a first circuit that reads electric charges accumulated in one photoelectric converter and a second circuit that reads electric charges accumulated in the other photoelectric converter. Furthermore, each image-pixel signal-reading circuit is positioned between the corresponding pair of photoelectric converters, and a shared segment exists in the first and second circuits.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with reference to the attached drawings.

Figure 1:
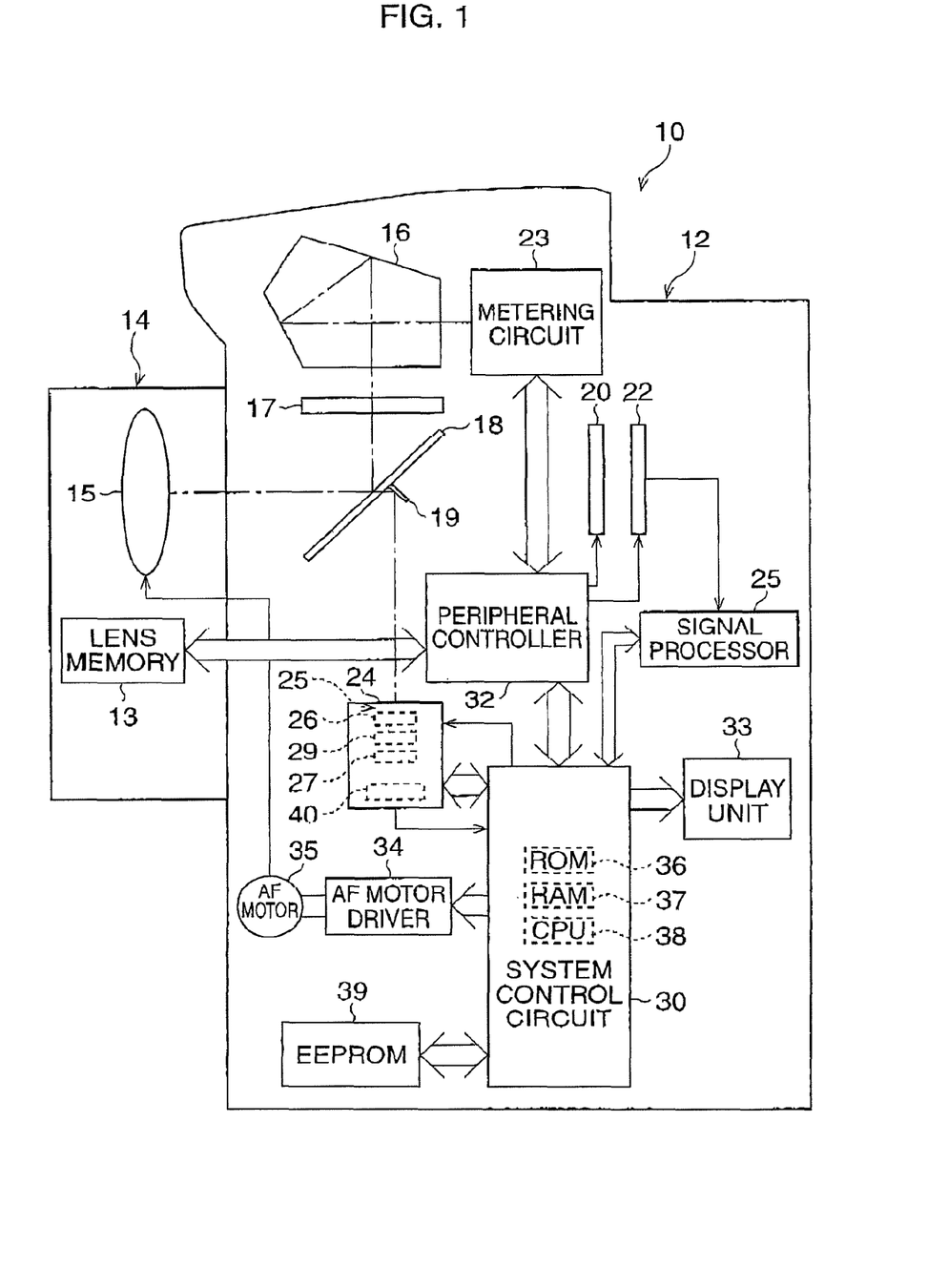
FIG. 1 is a schematic diagram of the inner construction of a digital camera according to the embodiment.

FIG. 1 is a schematic diagram of the inner construction of a digital camera according to the embodiment.

The SLR-type digital camera 10 is equipped with a body 12 and an interchangeable lens 14 removably attached to the body 12. The body 12 has a pentaprism 16, a quick return mirror 18, a focal plane shutter 20, and an image sensor 22 (e.g., a CCD).

A metering circuit 23 is arranged adjacent to the pentaprism 16, and detects the brightness of an object image formed by a pint glass 17 disposed above the quick return mirror 18, in accordance with a TTL metering method. An AF module 24, which is disposed below the quick return mirror 18, detects a focus state in accordance with a phase-difference method.

A system control circuit 30 having a ROM unit 36, a RAM unit 37, and a CPU 38 controls the operation of the camera 10 and outputs control signals to the metering circuit 23, the AF module 24, a peripheral controller 32, a display unit 34, and EEPROM 39, etc. The peripheral controller 32 controls an exposure mechanism including the focal plane shutter 20, an iris (not shown), and the image sensor 22. Also, the peripheral controller 32 obtains lens information from a lens memory 13 in the interchangeable lens 14.

When the camera 10 is powered ON a photographing mode is activated. Light passing through a photographing optical system 15 is directed to the pentaprism 16 via the quick return mirror 18. A user confirms an object through a viewfinder (not shown). When a release button (not shown) is depressed halfway, the metering circuit 23 detects the brightness of the object image and the AF module 24 detects an in-focus state.

A portion of the light passing through the photographing optical system 15 passes through the quick return mirror 18 and proceeds to the AM module 24 via a sub-mirror 19. The AF module 24 has an optical image-forming system 25 including a condenser lens 26, a separator lens 27, a separator mask 29, and a focus detector 40. The separator mask 29 is arranged on a conjugate surface equivalent to an image-forming surface (i.e., a photo-receiving surface of the image sensor 12), and divides an object image into two pairs of images. The separator lens 27 forms the two pairs of images on a photo-receiving surface of the AF module 24. Herein, the two pairs of images are perpendicular to each other. The in-focus detector 40 outputs image signals of the projected object images to the system control circuit 30.

The system control circuit 30 calculates an out-of-focus magnitude and carries out a focus-adjustment process. Concretely, the system control circuit 30 outputs control signals to an AF motor driver 34 based on the out-of-focus magnitude and out-of-focus direction. The AF motor 35 repositions a focusing lens in the photographing optical system 15 on the basis of driving signals supplied by the AF motor driver 34. The focus detection and lens drive processes are both carried out until an object image is in focus.

After the AF adjustment and brightness detection processes are carried out, the system control circuit 30 calculates exposure values, i.e., a shutter speed and an F number. When the release button is fully depressed, a series of recording processes are carried out. Namely, an object target image is formed on the image sensor 22 by the motions of the quick return mirror 18, the iris and the shutter 20, and then one frame's worth of image-pixel signals are read from the image sensor 22. A signal processor 25 generates digital image data from the read image-pixel signals. The generated image data is stored in a memory (not shown) such as a memory card.

Figure 2:
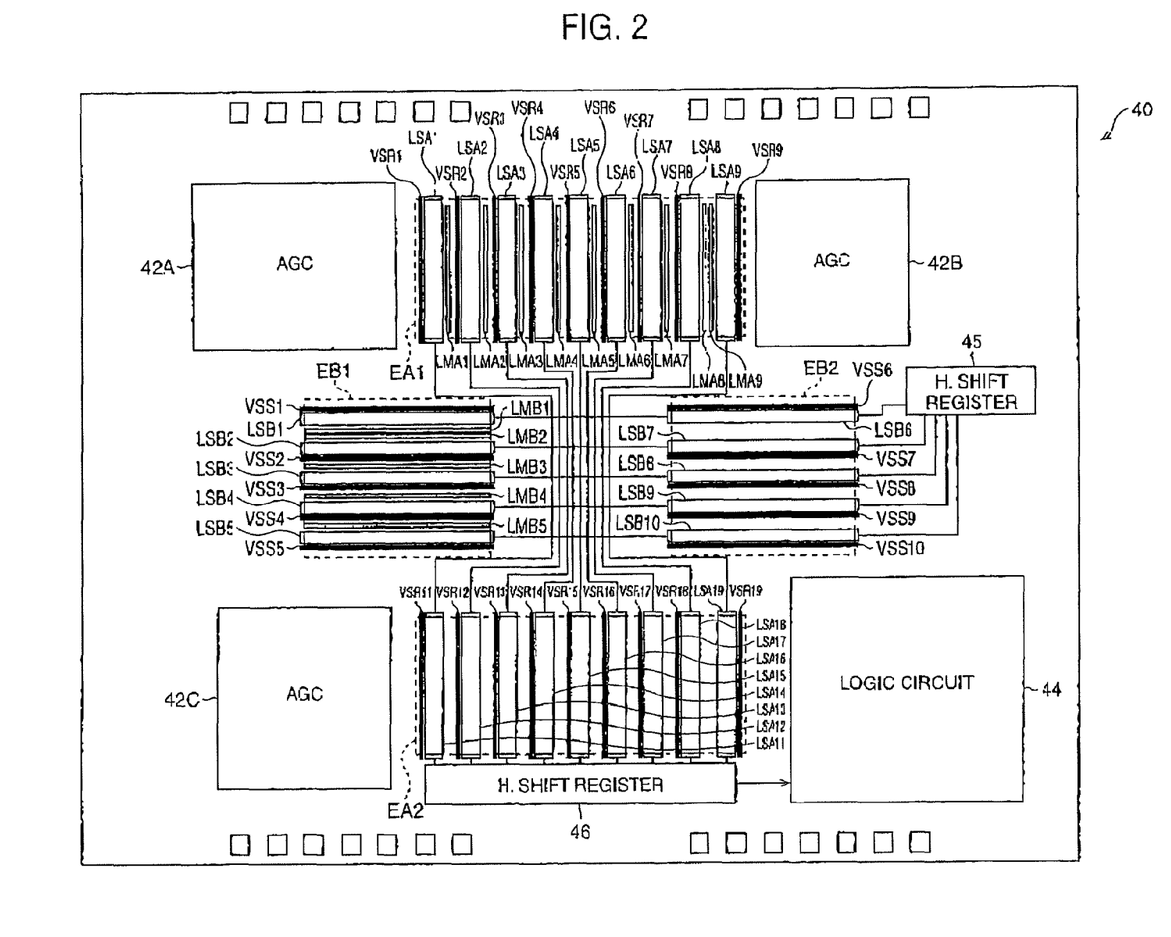
FIG. 2 is a block diagram of the focus detector.

FIG. 2 is a block diagram of the in-focus detector.

The in-focus detector 40 is constructed from an IC (Integrated Circuit) chip on which a plurality of CMOS-type line sensors is arranged. On the surface of the in-focus detector 40 a pair of line-sensor groups EA1 and EA2 is disposed so as to be opposite from each other along a vertical direction of the photo-receiving surface, and a pair of line-sensor groups EB1 and EB2 is disposed so as to be opposite from each other along a horizontal direction. Note that the vertical direction corresponds to the vertical direction of the photographed object image, and the horizontal direction corresponds to the horizontal direction of the object image. The line-sensor groups EA1 and EA2 and the line-sensor groups EB1 and EB2 are sandwiched around the center portion of the detector surface.

One pair of object images obtained from pupil division by the optical image-forming system 25 is projected onto the areas in which the line-sensor groups EA1 and EA2 are disposed, and the other pair of object images is projected onto areas in which the line-sensor groups EB1 and EB2 are disposed.

Each line-sensor group is composed of a plurality of line sensors arrayed along the horizontal (left-right) direction or vertical (upper-lower) direction at predetermined intervals. The line-sensor groups EA1 and EA2 are arrayed along the left-right direction, whereas line-sensor groups EB1 and EB2 are arrayed along the upper-lower direction. Each line-sensor is constructed from a plurality of photo-converters (herein, photodiodes) arrayed in a line.

The line-sensor group EA1 is composed of nine line sensors LSA1-LSA9, with each line sensor functioning as a standard line sensor. On the other hand, each one of the nine line sensors LSA11-LSA19 in the line-sensor group EA2 functions as a reference line sensor. Similarly, each one of the five line sensors from LSB1 to LSB5 functions as a standard line sensor, while each one of the five line sensors from LSB6 to LSB10 functions as a reference line sensor.

For the line-sensor groups EA1 and EB1, monitor sensors from LMA1 to LMA9 and from LMB1 to LMB5 are disposed alongside the line sensors from LSA1 to LSA9 and from LSB1 to LSB5, respectively. Each monitor sensor is composed of a plurality of photodiodes that divides the area of the neighboring line sensor into multiple sections. Each of the monitor sensors from LMA1 to LMA9 extends along the longitudinal direction, namely, alongside the neighboring line sensor, and outputs a "monitor signal" representing a quantity of light (intensity of light). Similarly, each monitor sensor from LMB1 to LMB5 also outputs a monitor signal.

Furthermore, vertical shift registers VSR1-VSR9 and VSS1-VSS5 are arranged adjacent to line sensors LSA1-LSA9 and LSB1-LSB5, respectively. Similarly, vertical shift registers VSR11-VSR19 and VSS6-VSS10 are arranged adjacent to line sensors LSA11-LSA19 and LSB6-LSB10, respectively. Then, a series of black level monitoring sensors (not shown) are arranged adjacent to the line sensors in line-sensor groups EA1 and EB1.

Each one of the three AGC (Auto Gain Control) circuits 42A-42C compares the values of the monitor signals received from the monitor sensors with a threshold value. Each AGC circuit determines whether a quantity of light incident on a target line sensor is sufficient for detecting an in-focus state. The threshold value is predetermined so as to prevent an overflow of light exceeding the dynamic range of a line sensor.

When the monitor signal exceeds the threshold value, the quantity of light incident on it is determined to be sufficient for detecting the in-focus state. Consequently, the accumulation of an electric charge by a target line sensor stops and the accumulated electric charges are temporarily stored in the line sensor.

A charge storage period for each line sensor is independently controlled, namely, individually adjusted in accordance with the distribution of the light intensity of an object. When the accumulation of electric charges is complete for all of the line sensors, image-pixel signals are output to the system control circuit 30 via an output circuit (not shown) by the vertical shift registers VSR1-VSR9, VSR11-VSR19, VSS1-VSS5, VSS6-VSS10 and horizontal shift registers 45, 46. In the system control circuit 30, an out-of-focus magnitude is obtained from the phase difference of the image-pixel signals.

A logic circuit 44 controls the AGC circuits 42A to 42C, vertical shift registers VSR1-VSR9, VSR11-VSR19, VSS1-VSS5, VSS6-VSS10, and horizontal shift registers 45, 46. Furthermore, the logic circuit 44 sets a threshold level associated with the monitor signal and sets an offset value based on a black level of the monitor sensors.

Figure 3:
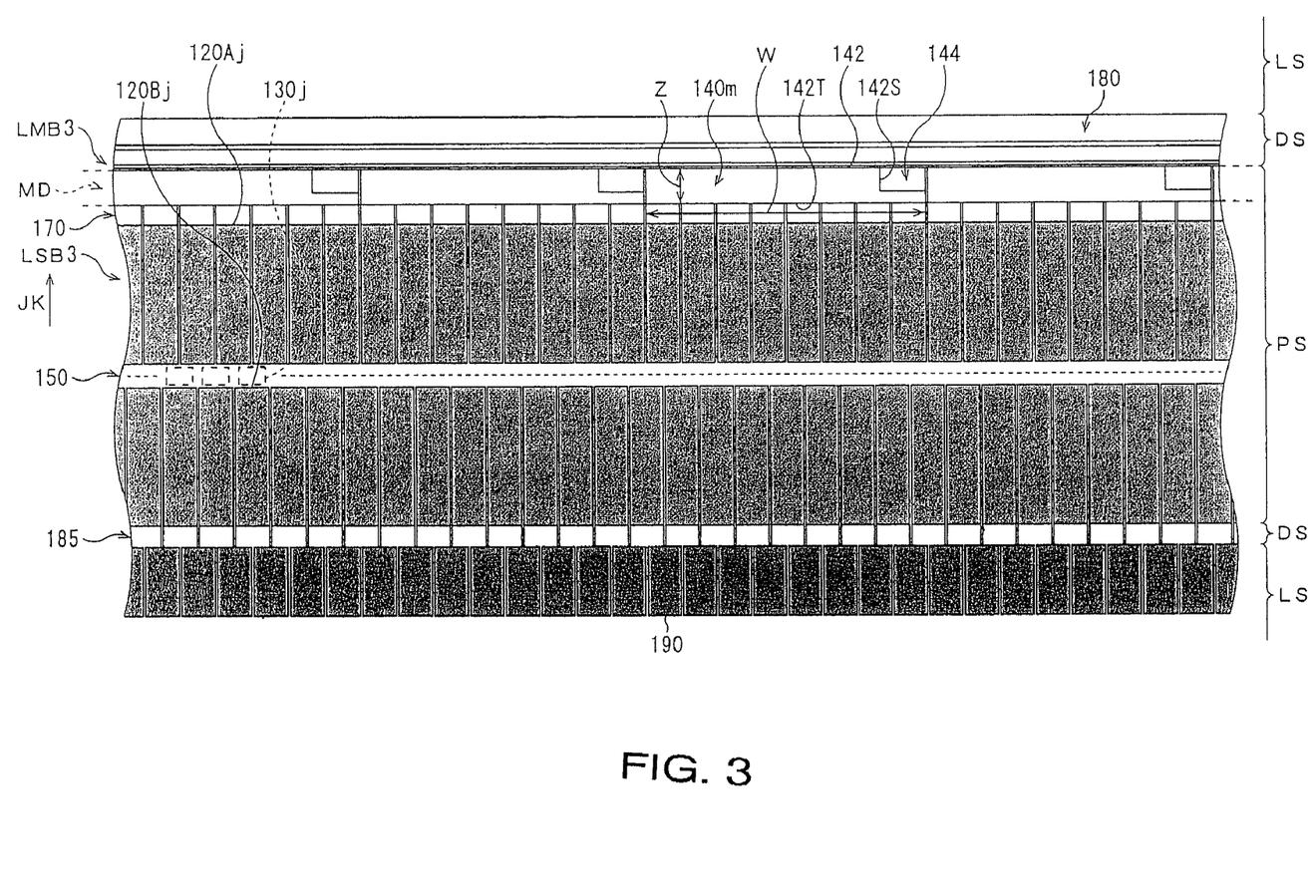
FIG. 3 is an enlarged illustration of the arrangement of one line sensor and a corresponding monitor sensor.

FIG. 3 is an enlarged illustration of the arrangement of one line sensor and a corresponding monitor sensor. Herein, the line sensor LS83 and the monitor sensor LMB3 shown in FIG. 2 are partially displayed. Note that the construction of the other line sensors and monitor sensors are the same as that for line sensor LSB3 and monitor sensor LMB3, respectively.

The line sensor LSB3 is constructed from a plurality of pairs of photodiodes, which are arrayed along the longitudinal direction of the line sensor LS83. Photodiodes $120A_j$ (j=1, 2, ..., n) in one line and photodiodes $120B_j$ (j=1, 2, n) in the other line are paired with each other and arranged in a staggered format.

The monitor sensor LMB3 is arrayed along the outside of the line sensor LSB3 with space separating it from the line sensor LSB3. Wiring 170 is arranged between the line sensor LSB3 and the monitor sensor LMB3, and wiring 180 is arranged outside of the monitor sensor LMB3. On the other hand, a vertical register 190 is provided below the line sensor LSB3 on the other side of the wiring 185.

Each pair of photodiodes $120A_j$ and $120B_j$ is rectangular and the longitudinal direction is parallel to the line-sensor-array direction "JK" of the line sensor group EB1, i.e., the upper and lower direction (see FIG. 2). The photodiodes $120A_j$ arrayed on the upper side are on the opposite side of a wiring circuit 150 from the photodiodes $120B_j$ arrayed on the lower side. The wiring circuit 150 includes signal output lines and control lines.

In the wiring 150 intervening between the photodiodes $120A_j$ and $120B_j$, an image-pixel signal output circuit $130_j$ (j=1, 2, ..., n) for a line sensor is provided (hereinafter, an "LSR" circuit). The LSR circuit $130_j$ reads electric charges from corresponding photodiodes $120A_j$ and $120B_j$ and outputs the read electric charges as image-pixel signals. The LPSO circuits $130_1$ to $130_n$ are arrayed along the longitudinal direction of the line sensor LSB3. Image-pixel signals generated in the entire line sensor LSB3 are output via the wiring 150.

The monitor sensor LMB3 is constructed of a plurality of fine sensor elements $140_m$ (m=1, 2, ..., n). The longitudinal direction of the fine sensor elements $140_m$ is parallel to the longitudinal direction of the line sensor LSB3. Each fine sensor element monitors several pairs of photodiodes. Herein, quantity of incident light for eight pairs of photodiodes is checked by one fine sensor element.

The fine sensor element 140m is equipped with a photoelectric converter 142 such as a photodiode, and an image-pixel signal-reading circuit 144 that outputs electric charges generated by the photoelectric converter 142 (hereinafter, an MSR circuit). The photoelectric converter 142 has a notch 142S at its end portion. The notch 142S is formed such that the rectangular MSR circuit 144 fits into the notch 142S; in other words, the MSR circuit 144 is fitted or nestled into the notch 142S.

The photoelectric converter 142 of the fine sensor element 140 has a side 142T, the length W of which completely covers eight pairs of photodiodes. As described above, the focus detection module 40 shown in FIG. 2 is an on-chip IC. A logic area LS for forming or printing the vertical shift register and a pixel-area PS for forming photodiodes and fine sensor elements are alternately arranged. Then, a separation area DS where wiring is installed intervenes between the logic area LS and the pixel area PS.

Figure 4:
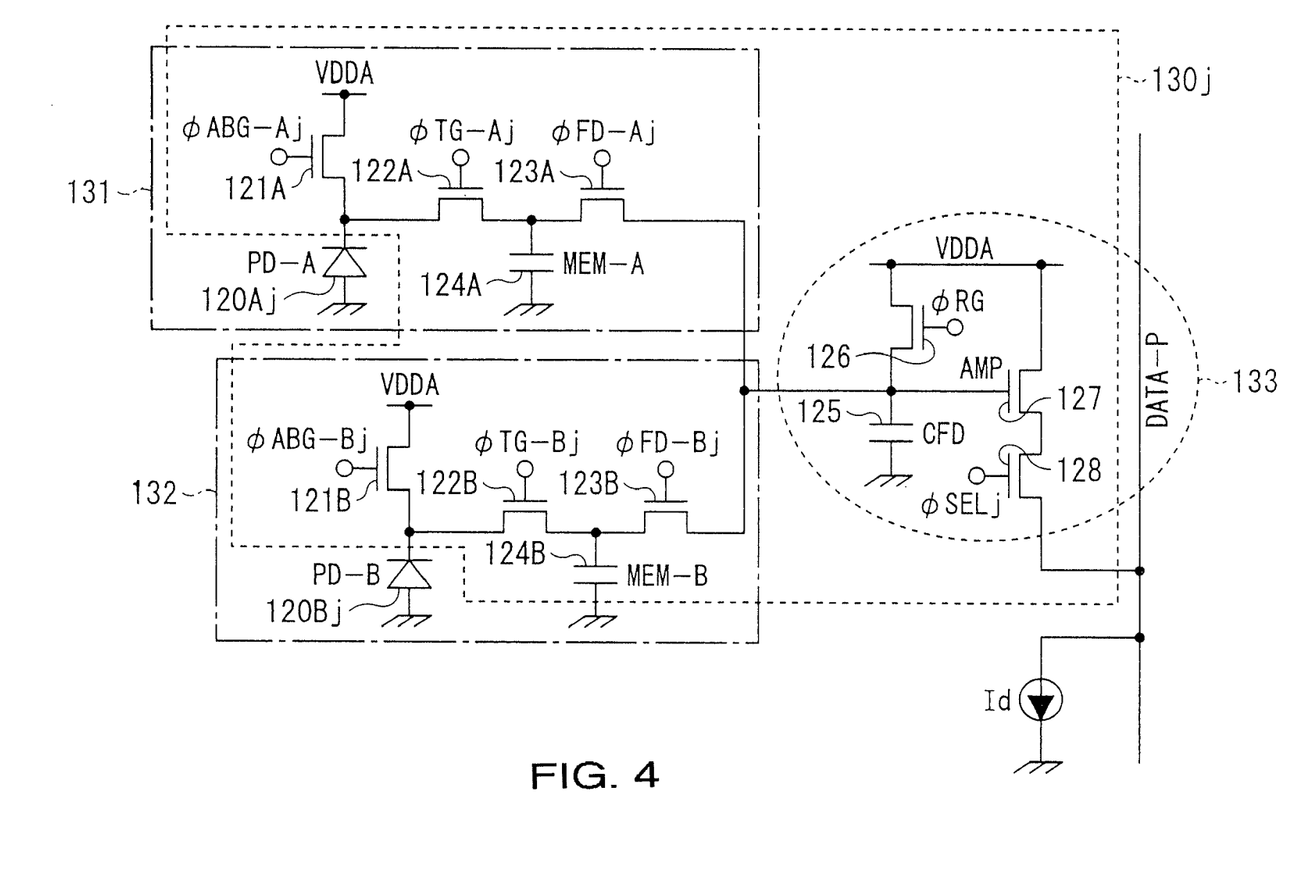
FIG. 4 is a schematic diagram of one LSR circuit.
Figure 5:
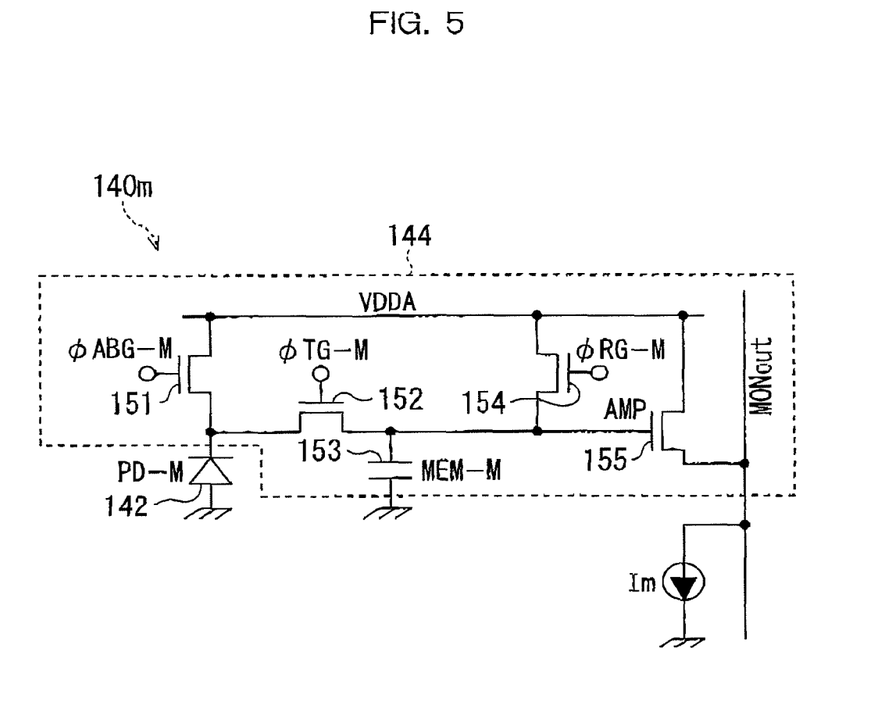
FIG. 5 is a schematic diagram of one MSR circuit.
Figure 6:
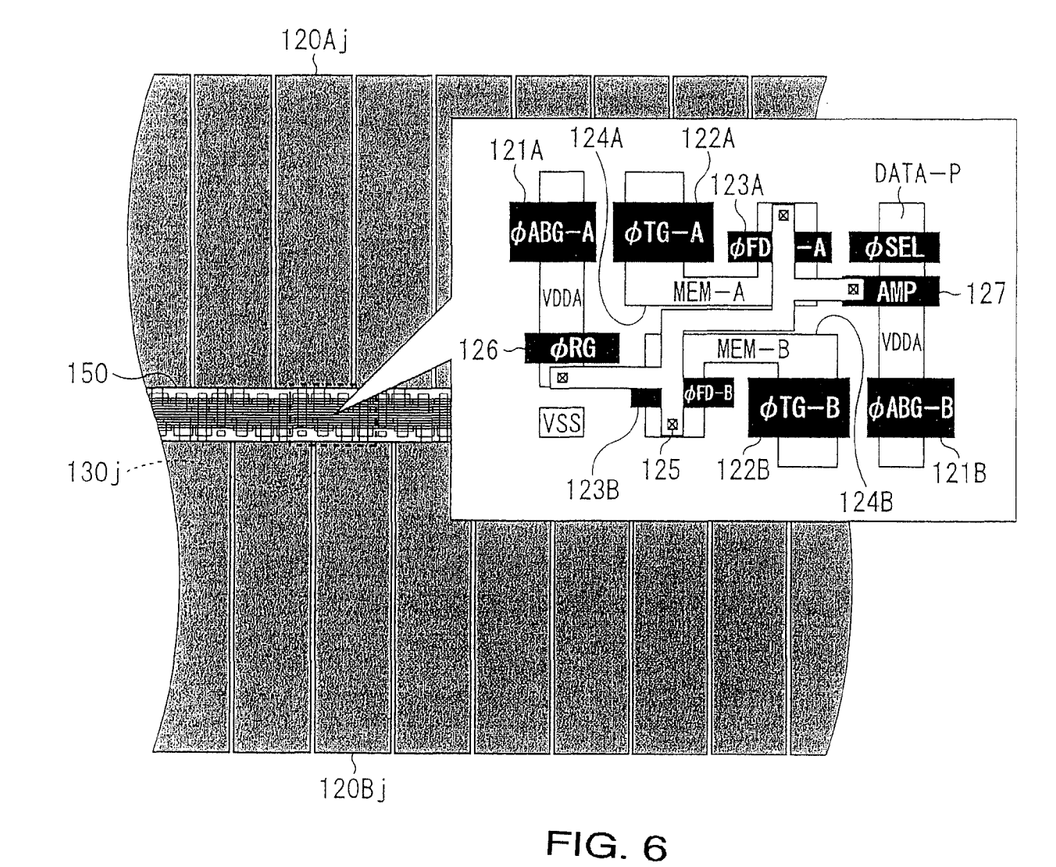
FIG. 6 is a wiring diagram of the LSR circuit.

FIG. 4 is a schematic diagram of one LSR circuit (image-pixel signal-reading circuit for the line sensor). FIG. 5 is a schematic diagram of one MSR circuit (image-pixel signal-reading circuit for the monitor sensor). FIG. 6 is a wiring diagram of the LSR circuit.

In FIG. 4, one pair of photodiodes $120A_j$ and $120B_j$ in the line sensor LSB and a construction associated with the LSRC $130j$ are shown. Both of the photodiodes $120A_j$ and $120B_j$ are connected to the LSRC $130_j$.

The LSR circuit $130_j$ is equipped with an anti-blooming gate (ABG) 121A such as a transistor, transfer gates (TG) 122A and 122B, and floating diffusion gates (FD) 123A and 123B. Furthermore, the LSR circuit $130_j$ is equipped with a shared circuit 133 that has capacitors (MEM) 124A and 124B for storing electric charges temporarily, a floating diffusion capacitor (CFD) 125 for converting an electric charge to a voltage, a reset gate (RG) 126, a source follower amplifier 127, and a selection gate 128.

The shared circuit 133 is a common circuit for reading and outputting image-pixel signals from the photodiodes $120A_j$ and $120B_j$. Electric charges generated in the photodiodes $120A_j$ are read and output by a particular circuit 131 and the shared circuit 133 (herein, called a "first circuit"). Also, Electric charges generated in the photodiodes $120B_j$ are read and output by a particular circuit 132 and the shared circuit 133 (herein, called a "second circuit"). In FIG. 6, a wiring pattern of the LSR circuit $130_j$ is shown schematically.

On the other hand, In the fine sensor element $140_m$ shown in FIG. 5, the photoelectric converter 142 is connected to the MSR circuit (image-pixel signal output circuit for the monitor sensor) 144. The MSR circuit 144 is equipped with an anti-blooming gate (ABG) 151, a transfer gate (TG) 152, a reset gate (RG) 154, a capacitor (MEM) 153, and a source follower amplifier 155.

In an AF process, electric charges are generated and accumulated in the series of photodiodes $120A_j$ and $120B_j$ of the line sensor LSB3. On the other hand, electric charges generated in the photoelectric converter 142 of the fine sensor element $140_m$ are successively converted to a voltage by the capacitor 143 and transmitted to the AGC circuit (see FIG. 2) via the source follower amplifier 155.

The fine sensor element $140_m$ monitors eight pairs of photodiodes to check incident light; i.e., it compares the signal level of electric charges to a threshold value in order to prevent at least one of eight pairs of photodiodes from receiving incident light that exceeds a dynamic range. An accumulation of electric charges generated in each of the eight pairs of photodiodes continues until the signal level detected by the fine sensor element $140_m$ exceeds the threshold value.

When the signal level exceeds the threshold value, the accumulation of electric charges for all eight pairs of photodiodes is terminated. The accumulated electric charges in the pair of photodiodes $120A_j$ and $120B_j$ are transmitted to the capacitors 124A and 125B, respectively, via the transfer gates 122A and 122B. The transmitted electric charges are temporarily stored in the capacitors 125A and 125B until the accumulation of electric charges for all of the remaining pairs of photodiodes in the other line sensors is terminated.

When the accumulation of electric charges for every pair of photodiodes is finished, the electric charges stored in the capacitors 124A and 124B are simultaneously transmitted to the floating diffusion capacitor 125 in the LSR circuit $130_j$. Consequently, electric charges generated in the photodiode $120A_j$ and electric charges generated in the photodiode $120B_j$ are mixed together and converted to voltage signals. The voltage signals are amplified by the source follower amplifier 127 and output from the AF module to the system control circuit 30 as image-pixel signals.

In this way, the line sensor according to the present embodiment is constructed from a plurality of pairs of photodiodes and the LSR circuits (image-pixel signal-reading circuit for a line sensor) are arranged between the pairs of photodiodes. Then, the shared circuit in the LSR circuit converts electric charges generated in each photodiode to voltage signals while mixing both of the electric charges together.

If the LSR circuits are arranged at both sides of the line sensor, the placement of the image-pixel signal-reading circuits on the AF module enlarges the pitch of neighboring line sensors and restricts the number of line sensors that can be arranged in a projection area. However, since the LSR circuits according to the present embodiment are arranged between the series of pairs of photodiodes, a wiring space can be integrated. Also, since the shared circuit segment exists, area of the image-pixel signal-reading circuit decreases. Consequently, the pitch of neighboring line sensors can be narrowed and many line sensors can be arranged within the projection area, resulting in precise focus detection.

Furthermore, since electric charges generated in the pair of photodiodes are mixed together, a high level of sensitivity for detecting light quantities is maintained so that precise focus detection can be carried out. Note that electric charges generated in one photodiode may be output separately without mixing with electric charges generated in another photodiode.

As for the focus-measurement method, either multiple focal point measurement or center focal point measurement may be applied. The number of line sensors and monitor sensors, or the number of line-sensor groups may be optionally set in accordance with the size and outline of the projection area. The AF module may be installed in another device with a photographing function, such as a cellular phone.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2009-168798 (filed on Jul. 17, 2009), which is expressly incorporated herein by reference, in its entirety.

The invention claimed is:

1. An apparatus for detecting an in-focus state, comprising:
   a plurality of line sensors arranged on a projection area of an optical image-forming system; and
   an image signal output processor that outputs image signals of an object on the basis of electric charges accumulated in the plurality of line sensors,
   each line sensor comprising a plurality of pairs of photoelectric converters arrayed along a longitudinal direction of the line sensor and a plurality of image-pixel signal-reading circuits,
   each image-pixel signal-reading circuit reading electric charges from a corresponding pair of photoelectric converters,
   each image-pixel signal-reading circuit comprising a first circuit that reads electric charges accumulated in one photoelectric converter of the pair of photoelectric converters and a second circuit that reads electric charges accumulated in the other photoelectric converter of the pair of photoelectric converters,
   each image-pixel signal-reading circuit being positioned between the corresponding pair of photoelectric converters, each of the first and second circuits including a common circuit portion that is shared by both said first and second circuits.

2. The apparatus of claim 1, wherein each image-pixel signal-reading circuit mixes electric charges accumulated in one photoelectric converter with electric charges accumulated in the other photoelectric converter.

3. The apparatus of claim 1, wherein the shared component in the first and second circuits comprises a voltage converter that converts electric charges to a voltage signal and an amplifier that amplifies the voltage signal.

4. The apparatus of claim 1, further comprising a monitor sensor that is arranged alongside a corresponding line sensor and monitors a quantity of light incident on the line sensor.

5. The apparatus of claim 1, wherein said plurality of pairs of photoelectric converters are arranged in a staggered format.

6. The apparatus of claim 1, wherein said apparatus is provided in a camera.

7. A focus detection sensor comprising:
   a plurality of pairs of photoelectric converters arrayed in a line; and
   a plurality of image-pixel signal-reading circuits, each image-pixel signal-reading circuit reading electric charges from a corresponding pair of photoelectric converters,
   each image-pixel signal-reading circuit comprising a first circuit that reads electric charges accumulated in one photoelectric converter of the pair of photoelectric converters and a second circuit that reads electric charges accumulated in the other photoelectric converter of the pair of photoelectric converters,
   each image-pixel signal-reading circuit being positioned between the corresponding pair of photoelectric converters, each of the first and second circuits including a common circuit portion that is shared by both said first and second circuits.

8. The apparatus according to claim 1, the first circuit and the second circuit each including capacitors that temporarily store electric charges and the common circuit portion including a floating diffusion capacitor that converts the electric charges to a voltage.

9. The apparatus according to claim 8, the common circuit portion including a reset gate, a source follower amplifier and a selection gate.

10. The apparatus according to claim 1, electric charges generated in the one photoelectric converter of the pair of photoelectric converters are read and output by the first circuit and by the common circuit portion, electric charges generated in the other photoelectric converter of the pair of photoelectric converters are read and output by the second circuit and by the common circuit portion.

11. The apparatus according to claim 1, the common circuit portion converts electric charges generated in each photoelectric converter of the pair of photoelectric converters to voltage signals while mixing both of the electric charges together.

12. The apparatus according to claim 1, a plurality of photoelectric converters of each of the plurality of pairs of photoelectric converters are positioned in lines parallel to each other with the image pixel signal reading circuits being positioned in a line between and parallel to the parallel lines of photoelectric converters.

13. The apparatus of claim 7, wherein each image-pixel signal-reading circuit mixes electric charges accumulated in one photoelectric converter with electric charges accumulated in the other photoelectric converter.

14. The apparatus of claim 7, wherein the shared component in the first and second circuits comprises a voltage converter that converts electric charges to a voltage signal and an amplifier that amplifies the voltage signal.

15. The apparatus of claim 7, further comprising a monitor sensor that is arranged alongside a corresponding line sensor and monitors a quantity of light incident on the line sensor.

16. The apparatus of claim 7, wherein said plurality of pairs of photoelectric converters are arranged in a staggered format.

17. The apparatus according to claim 7, the first circuit and the second circuit each including capacitors that temporarily store electric charges and the common circuit portion including a floating diffusion capacitor that converts the electric charges to a voltage.

18. The apparatus according to claim 17, the common circuit portion including a reset gate, a source follower amplifier and a selection gate.

19. The apparatus according to claim 7, electric charges generated in the one photoelectric converter of the pair of photoelectric converters are read and output by the first circuit and by the common circuit portion, electric charges generated in the other photoelectric converter of the pair of photoelectric converters are read and output by the second circuit and by the common circuit portion.

20. The apparatus according to claim 7, the common circuit portion converts electric charges generated in each photoelectric converter of the pair of photoelectric converters to voltage signals while mixing both of the electric charges together.

* * * * *